United States Patent Office 3,496,914
Patented Feb. 24, 1970

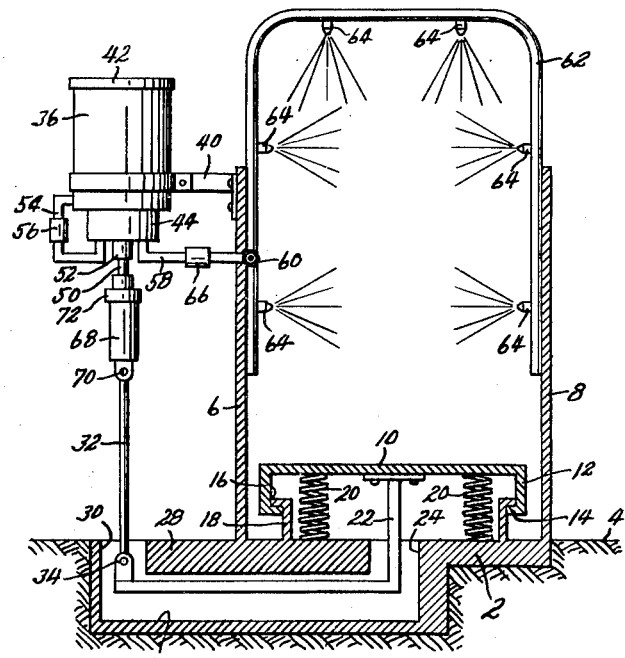

3,496,914
CATTLE SPRAYING DEVICE
Frank O. Cowan, R.R. 1, Golden City, Mo. 64748
Filed Oct. 3, 1967, Ser. No. 672,611
Int. Cl. A61d 7/00, 11/00
U.S. Cl. 119—157       3 Claims

ABSTRACT OF THE DISCLOSURE

A cattle spraying device comprising a chute through which cattle or other livestock may be driven, the floor of said chute comprising a treadle depressible by the weight of said cattle, and means operable by depression of said treadle to spray said cattle as they pass through said chute to continue the spray action after the treadle has been fully depressed and also to prevent over-spraying if a cow should balk or pause on the treadle.

---

This invention relates to new and useful improvements in devices for spraying cattle with liquid insecticide or the like.

Devices of this general type have heretofore been proposed wherein cattle are driven through a chute or passage about which spray nozzles are arranged, so that each animal is sprayed as it passes through the chute. However, difficulties are common with this type of device, particularly in insuring that each animal receives enough but not too much spray, and that the insecticide is not wasted. If the spray nozzles are operated continuously, the animals must move continuously at a uniform speed, since if an animal pauses or balks in the chute, he receives too much spray which may be harmful as well as wasteful. If there is any appreciable time lapse between the entry of successive animals into the chute, the insecticide is of course sprayed into the air and wasted. It is often difficult to drive the animals through the chute so that they move uniformly through the chute with substantially no spaces or gaps therebetween. The present invention is directed to a simple, economical solution of these problems.

Accordingly, the principal object of the present invention is the provision of a chute-type spraying device of the character described having means whereby the spraying mechanism is actuated by the presence of an animal in the chute, so that the sprays do not continue and waste the insecticide when no animal is in the chute. This action is entirely automatic, requiring no attention from a human operator.

Another object is the provision of a cattle spraying device of the character described wherein the duration of the spraying action and volume of insecticide dispensed as each animal passes through the chute is closely regulated and limited, so that the insecticide is not wasted if an animal should pause or balk while in the chute.

A further object is the provision of a cattle spraying device of the character described in which the spray mechanism is powered entirely by the weight of the animals themselves, requiring no power of any kind from any other source.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a partially schematic transverse vertical sectional view of a cattle spraying device embodying the present invention, with parts left in elevation, FIG. 2 is a top plan view of the device as shown in FIG. 1, FIG. 3 is an enlarged, fragmentary sectional view taken on line III—III of FIG. 2, and FIG. 4 is a fragmentary sectional view taken on line IV—IV of FIG. 3.

Like reference numerals apply to similar parts throughout the several views, and the numeral 2 applies to a planar base formed of concrete or other suitable material and sunk into the ground so that its upper surface is flush with the ground level 4. Formed integrally with or affixed to said base are a pair of upstanding vertical walls 6 and 8. Said walls are parallel and spaced apart to form a chute or passageway therebetween through which cattle may be driven, and the walls are sufficiently close together that the animals must pass therebetween in single file. The floor of said chute constitutes a horizontal, vertically movable treadle 10 having around its edges a depending skirt 12 having at its lower edge an inturned lip 14 (see FIG. 1) which is engaged beneath an out-turned lip 16 at the upper edge of an upstanding wall 18 affixed at its lower edge to base 10. The treadle is biased upwardly by springs 20 interposed between the treadle and the base, its upward movement being limited by the interengagement of lips 14 and 16, but is movable downwardly against said springs by the weight of an animal positioned thereon.

Affixed rigidly to the lower side of treadle 10 is a rigid arm 22 which projects downwardly into an opening 24 of base 2, and is then angled to extend horizontally through a passageway 26 in said base, the base being provided with a lateral extension 28 for this purpose, and terminates beneath an opening 30 in the top of said extension, in outwardly spaced relation from chute wall 6. A link 32 is pivoted as at 34 to the free end of arm 22, and functions to operate a spray pump, as will be described.

A tank 36 for containing liquid insecticide 38 or other liquid spray is mounted, as by bracket 40, on the outer surface of chute wall 6, above and generally in axial alignment with link 32. Said tank is provided with a removable cover 42. Affixed to the bottom of said tank is a hollow cylinder member 44 with its axis arranged vertically, and with its lower end closed by an end wall 46. A piston 48 is carried for vertical operative movement in said cylinder, and has affixed thereto a piston rod 50 extending vertically downwardly through a sealed fitting 52 in end wall 46. A conduit 54 interconnects the lower portion of tank 36 with cylinder 44, through end wall 46, and a check valve 56 is interposed in said conduit. Said check valve permits flow of liquid from the tank to the cylinder, but prevents flow in the opposite direction. A conduit 58 also interconnects with cylinder 44 through end wall 46, and interconnects with a header pipe 60 extending longitudinally of the chute inside of wall 46. Said header pipe interconnects with one or more spray pipes 62 (two shown). Said spray pipes have the form of arches of inverted U-shape, being sealed at their ends, and bridge the chute, being connected to the chute walls 6 and 8. Each spray pipe is fitted with a series of spray nozzles 64 positioned to spray an animal as it passes through the chute. The number and position of the spray nozzles may of course be selected as desired to insure thorough coverage of the parts of the animals to which it may be desired to apply the insecticide or the like. A check valve 66 is interposed in conduit 58, operable to permit flow of liquid from cylinder 44 to the spray nozzles, but to prevent flow in a reverse direction.

Piston rod 50 extends downwardly from cylinder 44 axially into a tubular spring housing 68 which is pivoted at its lower end, as at 70, to the upper end of link 32. Said piston rod may abut, but is not connected to, the closed lower end of said housing. Said housing is provided at its upper end with a cap 72, through which piston rod 50 is slidable, and a compression spring 74 is carried in said housing around the piston rod, said spring abutting at its upper end against said cap, and at its lower end against a pin 76 inserted transversely through said piston rod. When treadle 10 is at the upper limit of its travel, as represented in FIG. 1 by the interengagement of lips 14 and 16, link 32 raises housing 68 to abut the lower end of piston rod 50 to elevate piston 48 to the upper limit of its travel, as shown in FIGS. 3 and 4. Downward movement of the piston is adjustably limited by a screw 78 (see FIG. 4) threaded through end wall 46 of the cylinder and extending upwardly into the cylinder to abut the piston as the latter is lowered.

In use, when no animal is in the chute, the parts have the relative positions shown in the drawing, treadle 10 being elevated by springs 20 to cause engagement of lips 14 and 16, and piston 48 being elevated to the upper limit of its travel by the engagement of spring housing 68 with the lower end of piston rod 50. Cylinder 44, piston 48, check valves 56 and 66 and associated piping constitute a pump operable by movement of treadle 10. When an animal enters the chute, its weight depresses the treadle against springs 20, lowering arm 22 to exert tension on link 32 to lower spring housing 68. The pivotal end connections 34 and 70 of the link are sufficiently loose to accommodate any slightly non-vertical movement of arm 22 which may be caused by tilting of the treadle. Downward movement of spring housing 68 compresses spring 74, which in turn exerts downward pressure on piston rod 50 to bias piston 48 downwardly in cylinder 44. Since the cylinder below the piston is full of spray liquid, the liquid is pressurized, which closes check valve 56 and opens check valve 66, and liquid is forced through pipes 58, 60 and 62 to nozzles 64 from which it is ejected in spray form against the animal in the chute. The liquid is ordinarily not dispensed at as high a rate as it would be if treadle 10 were connected directly to the piston rod and the treadle were lowered at the same speed. Consequently, the liquid pressure in the cylinder retards the lowering of the piston to a rate slower than the rate at which treadle 10 is lowered, and spring 74 is compressed. Thereafter as long as the animal remains in the chute and his weight depresses the treadle, piston 48 will within certain limits, be continued in its downward stroke by the expansion of spring 74, to maintain the spraying operation. The spraying action is thus maintained for at least as long as it normally should require for the animal to pass through the chute. The total amount of spray which can be delivered on a single depression of the treadle is limited first by the degree of compression of spring 74, since obviously the spraying action will cease when said spring has expanded to its relaxed position, and secondly by screw 78, which adjustably limits the downward stroke of the piston. Preferably the compression stroke of spring 74 as provided by treadle 10 is longer than the maximum piston stroke permitted by screw 78, so that the screw itself functions as the limiting means. Thus by setting said screw properly, the maximum amount of spray liquid received by each animal can be limited. If the animal should pause or balk in the chute, the piston movement will be arrested by the screw to stop the spraying action, and the animal will not be sprayed excessively. Thus, normally, the animal will receive the desired quantity of spray when moving through the chute at a normal speed, but cannot be sprayed excessively. On the other hand, if the animal should run or move through the chute at a greater than normal speed, and therefore remove his weight from the treadle before he actually has received the desired quantity of spray, the spraying action ceases almost instantly, since the treadle is then elevated by springs 20, which in turn elevates arm 22, link 32 and spring housing 68 to relax spring 74. Thus the spray liquid is not wasted by operation of the nozzles when no animal is in the chute.

The length of the chute is of some importance, in that to continue the pumping action steadily, the treadle should be released and allowed to elevate after each animal has passed thereover. This could be assured by driving animals through the chute one at a time with any desired interval between successive animals. However this in itself would be a tedious operation and virtually the same type of treadle movement may be obtained by making the treadle sufficiently short to render it quite unlikely that successive animals would keep the treadle depressed continuously. A treadle length no greater, and even somewhat less than the length of each animal has been found effective for this purpose.

Finally it will be seen that each time treadle 10 is released, and elevated by springs 20, spring housing 68 will also be elevated to abut the lower end of piston rod 50 to elevate or retract piston 48, tending to create a vacuum within cylinder 44. This vacuum closes check valve 66 and opens check valve 56, drawing liquid from reservoir 36 through conduit 54 into the cylinder. The cylinder below the piston is thus maintained full of spray liquid at all times, ready to deliver the liquid to the spray nozzles when the treadle is next depressed.

While I have shown and described a specific embodiment of my invention, it will be readily apparent that many minor changes of structure and operation could be made without departing from the spirit of the invention.

What I claim as new and desire to protect by Letters Patent is:

1. A cattle spraying device comprising:
   (a) a base having upstanding walls defining a chute through which cattle may pass,
   (b) a treadle carried for vertical movement by said base and forming the floor of said chute, whereby to be depressed by the weight of cattle passing through said chute,
   (c) means yieldable biasing said treadle upwardly,
   (d) spray nozzles positioned to direct liquid spray against cattle within said chute,
   (e) a reservoir for spray liquid,
   (f) a conduit interconnecting said reservoir with said nozzles, and
   (g) a pump interposed in said conduit and operable by vertical oscillation of said treadle to deliver spray liquid under pressure to said nozzles, said pump comprising a rigidly mounted cylinder, a piston operably mounted in said cylinder for advancing and retracting movement therein, said conduit being interconnected intermediate said reservoir and spray nozzles to said cylinder in advance of said piston, a pair of check valve means interposed in said conduit respectively at opposite sides of its interconnection to said cylinder and each operable to permit liquid flow only toward said nozzles, and connecting means joining said treadle and said piston whereby said piston is advanced by depression of said treadle and retracted by release of said treadle said connecting means including a spring interposed therein operable to be elastically deformed to permit said treadle to be depressed more rapidly than said piston can be advanced, whereby advancement of said piston is continued by elastic recovery of said spring after said treadle is fully depressed.

2. A cattle spraying device as recited in claim 1 with the addition of a stop member carried by said cylinder and adjustable to variably limit movement of said piston in its direction of advancement.

3. A cattle spraying device comprising:
   (a) a base having upstanding walls defining a chute through which cattle may pass,
   (b) a treadle carried for vertical movement by said base and forming the floor of said chute, whereby to be depressed by the weight of cattle passing through said chute,
(c) means yieldably biasing said treadle upwardly,
(d) spray nozzles positioned to direct liquid spray against cattle within said chute,
(e) a reservoir for spray liquid,
(f) a conduit interconnecting said reservoir with said nozzles,
(g) a pump interposed in said conduit and operable by vertical oscillation of said treadle to deliver spray liquid under pressure to said nozzles, said pump comprising a rigidly mounted cylinder, a piston operably mounted in said cylinder for advancing and retracting movement therein, said conduit being interconnected intermediate said reservoir and spray nozzles to said cylinder in advance of said piston, a pair of check valve means interposed in said conduit respectively at opposite sides of its interconnection to said cylinder and each operable to permit liquid flow only toward said nozzles, and connecting means joining said treadle and said piston whereby said piston is advanced by depression of said treadle and retracted by release of said treadle,
(h) elastic means interconnected with said pump and operable to be resiliently deformed responsively to pressure induced in said conduit by said pump, and
(i) means operable by recovery of said elastic means to maintain pressure in said conduit for a limited time after cessation of operation of said pump.

References Cited

UNITED STATES PATENTS

| | | | |
|---|---|---|---|
| 1,303,851 | 5/1919 | Carlson | 119—159 |
| 1,460,561 | 7/1923 | Peterson | 119—159 |
| 3,108,574 | 10/1963 | Albers | 119—159 |
| 3,173,402 | 3/1965 | Cassel | 119—159 |

ALDRICH F. MEDBERY, Primary Examiner